US007866393B2

(12) United States Patent
Badalamenti et al.

(10) Patent No.: US 7,866,393 B2
(45) Date of Patent: *Jan. 11, 2011

(54) SWELLABLE ELASTOMERS AND ASSOCIATED METHODS

(75) Inventors: Anthony M. Badalamenti, Katy, TX (US); Ashok K. Santra, Duncan, OK (US); John R. Podowski, Austin, TX (US); Krishna M. Ravi, Kingwood, TX (US); Gary Thomas Keene, Den Haag (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,371

(22) Filed: Apr. 1, 2010

(65) Prior Publication Data

US 2010/0218949 A1    Sep. 2, 2010

Related U.S. Application Data

(63) Continuation of application No. 11/770,293, filed on Jun. 28, 2007, now Pat. No. 7,717,180.

(60) Provisional application No. 60/806,137, filed on Jun. 29, 2006.

(51) Int. Cl.
*E21B 33/13* (2006.01)
(52) U.S. Cl. ................... 166/292; 166/279; 166/300
(58) Field of Classification Search ............... None
See application file for complete search history.

(56) References Cited

U.S. PATENT DOCUMENTS 6,806,232 B1 * 10/2004  Cart ..................... 507/118

* cited by examiner

*Primary Examiner*—Zakiya W. Bates
(74) *Attorney, Agent, or Firm*—Craig W. Roddy; McDermott, Will & Emery

(57) ABSTRACT

Methods are provided that include a method of reducing fluid loss in a subterranean formation comprising placing a lost circulation composition comprising a base fluid and a swellable elastomer in at least a portion of a subterranean formation comprising a lost circulation zone; allowing the swellable elastomer to at least partially swell upon contact with a fluid; and allowing the lost circulation composition to at least partially reduce the loss of fluid to the subterranean formation. Additional methods are also provided.

7 Claims, No Drawings

SWELLABLE ELASTOMERS AND ASSOCIATED METHODS

CROSS REFERENCE TO RELATED APPLICATIONS

This application is a continuation of U.S. patent application Ser. No. 11/770,293, filed Jun. 28, 2007 now U.S. Pat. No. 7,717,180 which claims priority to commonly owned U.S. provisional patent application Ser. No. 60/806,137, filed Jun. 29, 2006 entitled "Swellable Elastomers and Associated Methods," which is incorporated herein by reference for all purposes.

BACKGROUND

The present invention relates to the treatment of subterranean formations. More particularly, the present invention relates to compositions and methods utilizing swellable elastomers in subterranean operations.

In subterranean operations, there may be several instances where it may be desirable to control or prevent the passage of fluid through a portion of a subterranean formation, control or prevent the production of an undesirable fluid through a well bore, and/or isolate specific areas in a well bore or zones in a subterranean formation. However, in many instances, it may be problematic to do these things for a variety of reasons.

A variety of methods have been employed in an attempt to address the above mentioned problems. For example, improved cement compositions have been used in cementing operations in an effort to prevent, inter alia, the failure of the cement and/or the formation of voids, cracks, fractures, holes and/or channels that may form in the cement. In addition, several remedial cementing methods have been developed. For example, one type of remedial cementing is commonly referred to as "squeeze cementing," and usually involves a method of preventing undesirable movement of oil, gas, or water through small holes or cracks in pipes disposed in the well bore; or annular spaces between the cement sheath and the pipe or walls of the well bore in permeable zones or fractures in subterranean formations by squeezing hydraulic sealant compositions, such as cement, therein which harden and form impermeable plugs.

Additionally, spacer fluids have been utilized to, inter alia, enhance drilling fluid and filter cake removal from the walls of a well bore. It is thought that inadequate removal of a filter cake from the walls of a well bore may result in a lack of a competent seal between the cement sheath and the well bore. Spacer fluids may be used to displace one fluid, such as a drilling fluid, in a well bore before entry into the well bore of another fluid, such as a cement composition. Among other things, a spacer fluid may be used not only to enhance drilling fluid and filter cake removal from the walls of well bores, but also to enhance solids removal during drilling operations, enhance displacement efficiency, and/or to physically separate chemically incompatible fluids. For example, in primary cementing, the cement composition may be separated from the drilling fluid and partially dehydrated drilling fluid may be removed from the walls of the well bore by placing a spacer fluid into the well bore between the drilling fluid and the cement composition.

Also, several methods have been utilized in an effort to prevent fluid loss and/or the undesirable production of water. For example, to prevent fluid loss and/or the undesirable production of water, additives commonly may be included in the treatment fluids. Examples of commonly used additives include, but are not limited to, gelling agents, such as hydroxyethylcellulose and xanthan. In addition, compounds referred to as relative permeability modifiers ("RPMs") have been utilized to decrease the production of undesirable water. One example of a commonly used RPM includes polyacrylamide. These conventional methods commonly work at the well bore and/or formation face, however, in some instances formation damage may occur. Additionally, the use of crosslinked fluids may impact fracture geometry, for example, creating wider, shorter fractures.

Swellable elastomers have heretofore been utilized in some subterranean operations, for example, zonal isolation methods. Swellable elastomers usually include materials that swell upon contact with a particular fluid. In some methods, these swellable elastomers are used in conjunction with packers that are placed in the annulus of a well bore. The packer is contacted with a specific fluid so that the swellable elastomer present in the packer expands to seal the annular space. While this method of sealing an annular space has generally been effective, a need still exists for other methods directed to preventing the undesirable passage of fluids.

SUMMARY

The present invention relates to the treatment of subterranean formations. More particularly, the present invention relates to compositions and methods utilizing swellable elastomers in subterranean operations.

In one embodiment, the present invention provides a method of reducing fluid loss in a subterranean formation comprising: placing a lost circulation composition comprising a base fluid and a swellable elastomer in at least a portion of a subterranean formation comprising a lost circulation zone; allowing the swellable elastomer to at least partially swell upon contact with a fluid; and allowing the lost circulation composition to at least partially reduce the loss of fluid to the subterranean formation.

In another embodiment, the present invention provides a method comprising: providing a viscosified treatment fluid comprising a base fluid, a swellable elastomer and a viscosifying agent, the viscosified treatment fluid having a viscosity; placing the viscosified treatment fluid into a least a portion of a subterranean formation; allowing the swellable elastomer to swell to form a swelled elastomer; allowing the viscosity of the viscosified fluid to be reduced to a second viscosity; and allowing the swelled elastomer to be placed in the subterranean formation.

In yet another embodiment, the present invention provides a method comprising: providing a spacer fluid comprising a base fluid and a swellable elastomer comprising at least one swellable elastomer selected from the group consisting of an acrylate butadiene rubber, a polyacrylate rubber, an isoprene rubber, a poly 2,2,1-bicyclo heptene, and an alkylstyrene; and introducing the spacer fluid into a least a portion of a subterranean formation between a first fluid and a second fluid in a subterranean operation.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to the treatment of subterranean formations. More particularly, the present invention relates to compositions and methods utilizing swellable elastomers in subterranean operations. These compositions and methods may be useful to prevent the undesirable passage of fluids in a variety of applications.

Although the compositions and methods of the present invention may be useful in a variety of applications, they may be particularly useful in a variety of well completion and remedial operations in subterranean formations and well bores penetrating such formations. The terms "well completion methods" or "well completion operations" are used herein to mean any of the operations utilized for completing the preparation of a well for hydrocarbon production, e.g., after it has been drilled, including the primary cementing of casing and liners in the well bore, consolidating gravel packs, or incompetent sands and formations and the like. The terms "remedial methods" or "remedial operations" are used herein to mean procedures carried out in subterranean formations or in well bores penetrating the formations to correct problems such as sealing cracks or voids, placing plugs in the well bore or in zones or formations containing undesirable fluids, placing temporary and/or permanent plugs (e.g., kick-off plugs, abandonment plugs, etc.) in lieu of packers to isolate zones or formations, filling external casing packers and the like. Additionally, the compositions of the present invention may be useful in proactive methods to selectively place a swellable elastomer in a desired portion of a well bore or subterranean formation in preparation for a subsequent treatment, such as cementing, etc.

In addition, the compositions and methods of the present invention may be useful to prevent voids, cracks, fractures, holes and/or channels from forming in the annular cement sheath; seal voids, cracks, fractures, holes and/or channels in the annular cement sheath; seal voids, cracks, fractures, holes and/or channels in the subterranean formation; prevent fluid loss; reduce the production of undesired water and/or gas from the subterranean formation; and/or in remedial cementing applications.

I. Compositions of the Present Invention Comprising Swellable Elastomers

The swellable elastomers suitable for use in the compositions of the present invention generally include any elastomer that swells upon contact with a selected fluid. A variety of swellable elastomers may be utilized in accordance with the present invention, including, but not limited to, those that swell upon contact with an oleaginous fluid and/or an aqueous fluid, such as water. Swellable elastomers suitable for use in the present invention may generally swell by up to approximately 500% of their original size at the surface. Under downhole conditions, this swelling may be more or less depending on the conditions presented. In some embodiments, the swelling may be up to about 200% under downhole conditions. Once swelled to at least some extent, the elastomers may be referred to as swelled elastomers.

Some specific examples of suitable elastomers that swell upon contact with an oleaginous fluid and/or an aqueous fluid include, but are not limited to, natural rubber, acrylate butadiene rubbers, polyacrylate rubbers, isoprene rubbers, choloroprene rubbers, butyl rubbers (IIR), brominated butyl rubbers (BIIR), chlorinated butyl rubbers (CIIR), chlorinated polyethylene (CM/CPE), neoprene rubbers (CR), styrene butadiene copolymer rubbers (SBR), sulphonated polyethylene (CSM), ethylene acrylate rubbers (EAM/AEM), epichlorohydrin ethylene oxide copolymers (CO, ECO), ethylene-propylene rubbers (EPM and EDPM), ethylene-propylene-diene terpolymer rubbers (EPT), ethylene vinyl acetate copolymers, fluorosilicone rubbers (FVMQ), silicone rubbers (VMQ), poly 2,2,1-bicyclo heptene (polynorborneane), alkylstyrene, crosslinked substituted vinyl acrylate copolymers and diatomaceous earth. Examples of suitable elastomers that swell when in contact with aqueous fluid include, but are not limited to, nitrile rubbers (NBR), hydrogenated nitrile rubbers (HNBR, HNS), fluoro rubbers (FKM), perfluoro rubbers (FFKM), tetrafluorethylene/propylene (TFE/P), starch-polyacrylate acid graft copolymers, polyvinyl alcoholcyclic acid anhydride graft copolymers, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like, polymethacrylate, polyacrylamide, non-soluble acrylic polymers, and highly swelling clay minerals such as sodium bentonite (having as main ingredient montmorillonite). Other swellable materials that behave in a similar fashion with respect to oleaginous fluids or aqueous fluids also may be suitable. Those of ordinary skill in the art, with the benefit of this disclosure, will be able to select an appropriate swellable elastomer for use in the compositions of the present invention based on a variety of factors, including the application in which the composition will be used and the desired swelling characteristics.

The swellable elastomers may be any shape or size, including, but not limited to, spherical, fiber-like, ovoid, ribbons, etc. In some embodiments, the swellable elastomers may be particles ranging in size from about $0.1\mu$ to about $2000\mu$. Other examples of suitable swellable elastomers that may be used in the methods of the present invention are disclosed in U.S. Application No. 2004/261990, the relevant disclosure of which is herein incorporated by reference.

Depending on the application to which the compositions may be put, the swellable elastomers may comprise from about 0.01% to about 50% by weight of the composition. In other embodiments, the swellable elastomer may comprise from about 0.01% to about 25% by weight of the composition. While these ranges may be suitable in certain embodiments, any amount within the disclosed range may also be suitable.

Some examples of the compositions that are contemplated in the present invention are discussed below.

A. Spacer Fluid Compositions Comprising a Swellable Elastomer

In one embodiment, a composition of the present invention comprises a spacer fluid comprising a base fluid and a swellable elastomer. The term "spacer fluid" is defined herein to include any fluid (e.g., a liquid, a gel, a gas, or combination thereof) that may be introduced into a subterranean formation prior to or after some other process or occurrence in the subterranean formation, and does not require any particular action by the spacer fluid.

The base fluids suitable for use in these embodiments may be non-aqueous fluids or aqueous fluids. Suitable non-aqueous fluids may include one or more organic liquids, such as hydrocarbons (e.g., kerosene, xylene, toluene, or diesel), oils (e.g., mineral oils or synthetic oils), esters, and the like. Aqueous fluids suitable for use in the spacer fluids may comprise fresh water, saltwater, brine, seawater, and/or any other aqueous fluid that does not adversely react with the other components used in accordance with this invention or with the subterranean formation. Generally, the base fluid may be present in the spacer fluids in an amount in the range of from about 1% to about 99.9% by weight of the spacer fluid. In some embodiments, the base fluid is present in the spacer fluids in an amount in the range of from about 65% to about 75% by weight of the fluid. While these ranges may be suitable in certain embodiments, any amount within the disclosed range may also be suitable.

Generally, the swellable elastomer may be present in the spacer fluids in an amount believed to be sufficient to seal a void, crack, hole, and/or channel, or to perform another desired function. In some embodiments, the swellable elastomer may be present in an amount in the range of from about 0.1% to about 50% by weight of the spacer fluid. In other embodiments, the swellable elastomer may be present in an amount in the range of from about 0.1% to about 10% by weight of the spacer fluid. In other embodiments, the swellable elastomer may be present in an amount in the range of from about 3% to about 8% by weight of the spacer fluid. While these ranges may be suitable in certain embodiments, any amount within the disclosed range may also be suitable. Those of ordinary skill in the art, with the benefit of this disclosure, will be able to select an appropriate amount of the swellable elastomer to include in the spacer fluids of the present invention based on a variety of factors, including the application in which the composition will be used, compatibility with other treatment fluids, and the desired swelling characteristics.

Additional additives may be added to the spacer fluids as deemed appropriate by one skilled in the art. Examples of suitable additives include, but are not limited to, viscosifying agents, fluid loss additives, salts, shale swelling inhibitors, weighting agents, dispersing agents, foaming and stabilizing surfactants, well bore scouring materials, friction reducers, and numerous other additives suitable for use in spacer fluids.

Spacer fluids like these may be useful in any subterranean operation where it may be desirable, among other purposes, to have a buffer between two fluids during subterranean operations, to clean out undesirable substances (e.g., oil, residue, or debris) from the pore spaces in the matrix of the subterranean formation, and/or to prepare the subterranean formation for later placement of a consolidation treatment.

B. Cement Compositions Comprising a Swellable Elastomer

In some embodiments, a composition of the present invention comprises a cement, an aqueous fluid, and a swellable elastomer. Any cement suitable for use in the desired application may be suitable for use in these cement compositions. While a variety of cements may be suitable, in some embodiments, the cement compositions may comprise a suitable cementitious material such as a hydraulic cement, although others may be suitable. A variety of hydraulic cements may be utilized in accordance with the present invention, including, but not limited to, those that comprise calcium, aluminum, silicon, oxygen, and/or sulfur, which set and harden by reaction with water. Suitable hydraulic cements, include, but are not limited to, Portland cements, pozzolana cements, gypsum cements, high alumina content cements, slag cements, and silica cements, and combinations thereof. In certain embodiments, the hydraulic cement may comprise a Portland cement. In some embodiments, the Portland cements may be classified as Class A, C, G and H according to American Petroleum Institute, *API Specification for Materials and Testing for Well Cements*, API Specification 10, 5th Edition, Jul. 1, 1990.

The aqueous fluid suitable for use in the cement compositions of the present invention may be from any source, provided that it does not contain an excess of compounds that adversely affect other compounds in the cement compositions. For example, a cement composition suitable for use in the present invention may comprise freshwater, saltwater (e.g., water containing one or more salts dissolved therein), brine (e.g., saturated saltwater), seawater, or combinations thereof. The water may be present in an amount sufficient to form a pumpable slurry. Generally, the water is present in the cement compositions of the present invention in an amount in the range of from about 20% to about 180% by weight of cement.

Generally, the swellable elastomer may be present in the cement compositions in an amount believed to be sufficient to seal a void, crack, hole, and/or channel, or to perform another desired function. In some embodiments, the swellable elastomer may be present in an amount in the range of from about 0.1% to about 50% by weight of cement. In other embodiments, the swellable elastomer may be present in an amount in the range of from about 0.1% to about 10% by weight of cement. In other embodiments, the swellable elastomer may be present in an amount in the range of from about 3% to about 8% by weight of cement. While these ranges may be suitable in certain embodiments, any amount within the disclosed range may also be suitable. Those of ordinary skill in the art, with the benefit of this disclosure, will be able to select an appropriate amount of the swellable elastomer to include in the cement compositions of the present invention based on a variety of factors, including the application in which the cement composition will be used and the desired swelling characteristics.

In some embodiments, a cement composition of the present invention may comprise a cement, water, and a swellable elastomer in an amount of up to about 10%. In those embodiments where the swellable elastomer is included in the cement composition in the amount of about 10%, the swellable elastomer may swell upon contact with an oleaginous fluid, e.g., diesel, synthetic base mud, etc., and thus, the cement composition may expand in an amount in the range of from about 0.5% to about 5%. Generally, the cement composition may expand more as time elapses. For example, in some embodiments, where a cement composition of the present invention is in contact with a synthetic drilling mud, the cement compositions of the present invention may expand in an amount in the range of from about 0.6% to about 0.9% after 5 days, from about 0.7% to about 1.% after 9 days, from about 0.9% to about 1.3% after 20 days, from about 1.2% to about 1.5% after 41 days, from about 1.4% to about 1.6% after 56 days, and from about 1.7% to about 1.8% after 79 days. Similarly, in some embodiments, where a cement composition of the present invention is in contact with diesel, the cement compositions of the present invention may expand in an amount in the range of from about 1.2% to about 1.6% after 5 days, from about 1.7% to about 2.2% after 9 days, from about 2.2% to about 3% after 20 days, from about 2.2% to about 3.8% after 41 days, from about 3.2% to about 4.1% after 56 days, and from about 3.5% to about 4.6 after 79 days.

The cement compositions of present invention may optionally comprise a dispersant. Where present, the dispersant acts, inter alia, to control the rheology of the cement composition and to stabilize the cement composition over a broad density range. While a variety of dispersants known to those skilled in the art may be used in accordance with the present invention, one suitable dispersant comprises a graft copolymer having a backbone of a condensation product of formaldehyde, acetone and sodium bisulfite, commercially available under the trade name CFR-8™ cement dispersant from Halliburton Energy Services, Inc., Duncan, Okla. Another example of a suitable dispersant is a condensation product of ketone, aldehyde, and compound introducing acid groups. Examples of these types of condensation products are condensation products of acetone, formaldehyde, and sodium bisulfite, and those in U.S. Pat. No. 4,818,288, the disclosure of which is incorporated herein by reference. Another example of a suitable dispersant is a polyamide graft copolymer containing at least one side chain formed from aldehydes and sulfur-containing acids or their salts. Examples of these types of copolymers are condensation products of sodium naphthalene sulfonic acid and formaldehyde, and those in U.S. Pat. No. 6,681,856, the disclosure of which is incorporated herein by reference. Combinations of suitable dispersants also may be used. In some embodiments, the dispersant is present in the cement compositions in an amount in the range of from about 0 to about 5 pounds per barrel of water.

Optionally, other additional additives may be added to the cement compositions as deemed appropriate by one skilled in the art, with the benefit of this disclosure. Examples of such additives include, but are not limited to, accelerators, set retarders, weight reducing additives, heavyweight additives, lost circulation materials, filtration control additives, foaming agents, defoamers, salts, vitrified shale, fly ash, fiber, strength retrogression additives, expanding additives, yield stress reducing agents, and combinations thereof. For example, a strength retrogression additive, such as crystalline silica, may be used to prevent high-temperature strength retrogression that occurs to set cement compositions in high-temperature wells. Examples of suitable crystalline silica are SSA-1 and SSA-2 strength stabilization agents, from Halliburton Energy Services, Inc., Duncan, Okla. One of ordinary skill in the art, with the benefit of this disclosure, will be able to recognize where a particular additive is suitable for a particular application.

These cementing compositions may be useful in primary and remedial cementing operations.

In some embodiments, the swellable elastomers may migrate to the edges of the cement composition as it sets, e.g., towards the microannuli created by the casing and/or the subterranean formation. The swellable elastomers may then swell due to the presence of fluids present in those microannuli, which may lead to better sealing. This migration may be due to chemical potential or hydrophobicity.

In some embodiments, the swellable elastomers may also float or sink to a given location within the cement composition, and then congeal to form a mass.

C. Treatment Fluids Comprising a Swellable Elastomer

In some embodiments, the swellable elastomers of the present invention also may be used in subterranean treatment fluids. In such treatment fluids, it is contemplated that the swellable elastomers may, among other things, expand to seal any voids, cracks, fractures, holes and/or channels present in their vicinity. It is believed that this may reduce the subsequent problems associated with undesirable fluids flowing into the well bore from the subterranean formation and/or from one portion of a subterranean formation to another portion. The treatment fluids of the present invention may be used in a variety of subterranean treatments. Such treatments include, but are not limited to, drilling operations, stimulation operations, well completion operations and remedial operations. As used herein, the term "treatment," or "treating," refers to any subterranean operation that uses a fluid in conjunction with a desired function and/or for a desired purpose. The term "treatment," or "treating," does not imply any particular action by the fluid or any component thereof.

The treatment fluids of the present invention generally comprise a base fluid and a swellable elastomer. A variety of additional additives suitable for use in the chosen treatment may be included in the treatment fluids as desired. The base fluids suitable for use in these embodiments may be non-aqueous fluids or aqueous fluids. Suitable non-aqueous fluids for use in the treatment fluids may include one or more organic liquids, such as hydrocarbons (e.g., kerosene, xylene, toluene, or diesel), oils (e.g., mineral oils or synthetic oils), esters, and the like. Examples of aqueous fluids suitable for use in the treatment fluids may include freshwater, saltwater, brine (e.g., saturated saltwater), or seawater. The aqueous fluid may be from any source, provided that it does not contain components that may adversely affect other components in the treatment fluid. Generally, the base fluid may be present in the treatment fluids in an amount in the range of from about 1% to about 99.9% by weight of the treatment fluid. In some embodiments, the base fluid is present in the treatment fluids in an amount in the range of from about 65% to about 75% by weight of the fluid. While these ranges may be suitable in certain embodiments, any amount within the disclosed range may also be suitable.

The amount of the swellable elastomer material to include in the treatment fluids is dependent on a variety of factors, including, but not limited to, the application in which the treatment fluid is to be utilized. In some embodiments, the swellable elastomer should be present in the treatment fluids in an amount in the range of from about 0.01% to about 50% by weight of the treatment fluid. In other embodiments, the swellable elastomer should be present in the treatment fluids in an amount in the range of from about 0.5% to about 20% by weight of the treatment fluid. While these ranges may be suitable in certain embodiments, any amount within the disclosed range may also be suitable. Those of ordinary skill in the art, with the benefit of this disclosure, will be able to select an appropriate amount of the swellable elastomer to include in the treatment fluids of the present invention based on a variety of factors, including the application in which the fluid will be used, compatibility with other treatment fluids, and the desired swelling characteristics.

Additional additives may be added to the treatment fluids as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, acids, conventional fluid loss control additives, viscosifying agents, cross linking agents, gel breakers, shale swelling inhibitors, combinations thereof, and the like.

In certain embodiments, the treatment fluid may be a drilling fluid, a fracturing fluid, a work over fluid, a well bore cleanup fluid, a gravel packing fluid, or any other suitable fluids used in subterranean treatments. In another embodiment, the treatment fluid may be a preflush that is introduced into the well bore prior to the subterranean treatment.

In some embodiments, the swellable elastomers may also float or sink to a given location within the treatment fluid composition, and then congeal to form a mass.

II. Certain Methods of the Present Invention

The methods of the present invention may be utilized in any portion of a subterranean formation including, but not limited to, those penetrated by a horizontal, vertical, inclined, or otherwise formed portion of a well bore. In addition, these methods can be performed at any time during the life of the well formed therein.

A. Methods Involving Spacer Fluids

In some embodiments, the methods of the present invention involve introducing a spacer fluid comprising a base fluid and a swellable elastomer into a subterranean formation. The spacer fluids may be introduced into the subterranean formation, among other purposes, to be a buffer between two fluids during subterranean operations, to clean out undesirable substances (e.g., oil, residue, or debris) from the pore spaces in the matrix of the subterranean formation, and/or to prepare the subterranean formation for later placement of a consolidation treatment.

It is believed that during normal leak off of the spacer fluids into the subterranean formation, the swellable elastomers, among other things, may expand to seal any voids, cracks, fractures, holes and/or channels present therein. It is believed that this may reduce the subsequent problems associated with undesirable fluids flowing into the well bore from the subterranean formation. Additionally, in some embodiments, an acidic spacer fluid may be introduced into at least a portion of the subterranean formation that may, inter alia, dissolve undesirable substances in the subterranean formation.

Such spacer fluids of the present invention may be used in any application where a spacer fluid is appropriate. For instance, one may be used between a drilling fluid and a cement composition. Another example is between different drilling fluids during drilling fluid change-outs. Another example is between drilling fluids and completion brines. The spacer fluids may be introduced into the subterranean formation using any means suitable for introducing fluids into the subterranean formation. For instance, the spacer fluid may be introduced into the subterranean formation by the methods disclosed in U.S. Pat. Nos. 6,668,927, 4,588,032, and 6,852,676, the relevant disclosures of which are herein incorporated by reference.

One example of such a method comprises introducing a spacer fluid comprising a base fluid and a swellable elastomer into a subterranean formation; and allowing the swellable elastomer to swell to do at least one of the following: seal voids, cracks, fractures, holes and/or channels.

In another embodiment, the method comprises introducing a spacer fluid comprising a base fluid and a swellable elastomer into a subterranean formation; and allowing a fluid to come into contact with the swellable elastomer so that it swells to do at least one of the following: seal a void, a crack, a fracture, a hole, a channel, and/or a combination thereof.

B. Methods Involving Cement Compositions

In some embodiments, the methods of the present invention involve introducing a cement composition comprising cement, an aqueous fluid and a swellable elastomer into a subterranean formation. The cement compositions may be introduced into the subterranean formation, among other purposes, to provide bonding between casing and/or liners disposed in well bores and the walls of the well bores. They also may be used for primary and remedial cementing operations. Additionally, the methods of the present invention are particularly suitable for performing squeeze remedial operations wherein the sealant is forced into cracks and/or voids to provide a seal therein.

Other operations in which the methods are particularly suitable include, but are not limited to, consolidated gravel packs or incompetent formations exposed to high temperatures and pressures, forming temporary or permanent plugs or packers in well bores including horizontal well bores, forming lightweight floatation barriers above liquid hydrocarbons in caverns and the like.

In one embodiment, the methods of the present invention for forming temporary or permanent plugs or seals in a well bore or in one or more subterranean formations penetrated by the well bore generally comprise the steps of placing a cement composition of the present invention in the subterranean formation or in the well bore penetrating the formation at a desired location therein; allowing the swellable elastomer to swell; and allowing the cement composition to set. Permanent plugs may be useful when abandoning a well.

In another embodiment, a method of the present invention comprises: providing a cement composition comprising a cement, an aqueous fluid and a swellable elastomer material; placing the cement composition into a location to be cemented; and allowing the cement composition to set therein. The location to be cemented may be above ground or in a subterranean formation. For example, the cement composition may be placed into an annulus between a pipe string located in a well bore and a subterranean formation penetrated by the well bore. The cement compositions may be introduced into the subterranean formation using any means suitable for introducing cements into the subterranean formation.

In some embodiments, the swellable elastomers in the cement compositions of the present invention may counteract pressure losses in the cement compositions that may be due to shrinkage factors and the like.

C. Methods Involving Treatment Fluid Compositions

In some embodiments, the methods of the present invention involve introducing a treatment fluid comprising a base fluid and a swellable elastomer material into a subterranean formation. The treatment fluids may be introduced into the subterranean formation, among other purposes, to at least partially reduce fluid loss, at least partially seal a perforation, and/or at least partially inhibit the production of undesirable water and/or gas from the subterranean formation. Operations in which the methods are particularly suitable include, but are not limited to, consolidated gravel packs or incompetent formations exposed to high temperatures and pressures, forming temporary or permanent plugs or packers in well bores including horizontal well bores, forming lightweight floatation barriers above liquid hydrocarbons in caverns and the like.

In one embodiment, a method of the present invention comprises providing a treatment fluid comprising a base fluid and a swellable elastomer material; introducing the treatment fluid into the subterranean formation; and allowing the swellable elastomer to swell and at least partially reduce fluid loss.

In another embodiment, a method of the present invention comprises providing a treatment fluid comprising a base fluid and a swellable elastomer material; introducing the treatment fluid into the subterranean formation; and allowing the swellable elastomer to swell and at least partially seal a perforation.

In yet another embodiment, a method of the present invention comprises providing a treatment fluid comprising a base fluid and a swellable elastomer material; introducing the treatment fluid into the subterranean formation; and allowing the swellable elastomer to swell and at least partially inhibit the production of undesirable water or gas from the subterranean formation.

In yet another embodiment, the present invention provides a method comprising: providing a viscosified treatment fluid comprising swellable elastomers and a viscosifying agent, the viscosified treatment fluid having a viscosity; placing the viscosified treatment fluid into a subterranean formation; allowing the viscosity of the viscosified fluid to be reduced to a second viscosity; and allowing the swellable elastomers to be placed in the subterranean formation. In some embodiments, the swellable elastomers may be placed toward the top of the treatment fluid. In others, the swellable elastomers may be placed toward the bottom of the treatment fluid. Optionally, a breaker may be incorporated into the viscosified treatment fluid or added to the fluid, if desired. Examples of such suitable breakers for viscosified treatment fluids of the present invention include, but are not limited to, sodium chlorite, hypochlorite, perborate, persulfates, peroxides, including organic peroxides. Other suitable breakers include suitable acids. Preferred examples of suitable breakers for viscosified treatment fluids of the present invention that include a gelling agent that comprises diutan include peroxide breakers. Preferred examples include tert-butyl hydroperoxide and tert-amyl hydroperoxide. A breaker may be included in a viscosified treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the chosen breakers with a material that will degrade when downhole so as to release the breaker when desired. Resins that may be suitable include, but are not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples include polysaccharides such as dextran or cellulose; chitins; chitosans; proteins; aliphatic polyesters; poly(lactides); poly(glycolides); poly(ӱ-caprolactones); poly(hydroxybutyrates); poly(anhydrides); aliphatic polycarbonates; orthoesters, poly(orthoesters); poly(amino acids); poly(ethylene oxides); and polyphosphazenes. If used, a breaker should be included in a composition of the present invention in an amount sufficient to facilitate the desired reduction in viscosity in a viscosifier treatment fluid. For instance, peroxide concentrations that may be used vary from about 0.1 to about 10 gallons of peroxide per 1000 gallons of the viscosified treatment fluid. Optionally, the viscosified treatment fluid may contain an activator or a retarder, inter alia, to optimize the break rate provided by the breaker. Any known activator or retarder that is compatible with the particular breaker used is suitable for use in the present invention. Examples of such suitable activators include, but are not limited to, chelated iron, copper, cobalt, and reducing sugars. An example of a suitable retarder includes sodium thiosulfate diethylene triamine. In some embodiments, the sodium thiosulfate may be used in a range of from about 5 to about 2000 lbs. per 1000 gallons of viscosified treatment fluid. An artisan of ordinary skill with the benefit of this disclosure will be able to identify a suitable activator or retarder and the proper concentration of such activator or retarder for a given application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of reducing fluid loss in a subterranean formation comprising:
    placing a lost circulation composition comprising a base fluid and at least one swellable elastomer selected from the group consisting of an acrylate butadiene rubber, a chloroprene rubber, a chlorinated polyethylene, a sulphonated polyethylene, an epichlorohydrin ethylene oxide copolymer, an ethylene vinyl acetate copolymer, a fluorosilicone rubber, a silicone rubber, a poly 2,2,1-bicyclo heptene, a crosslinked substituted vinyl acrylate copolymer, diatomaceous earth, a hydrogenated nitrile rubber, a fluoro rubber, a perfluoro rubber, a tetrafluorethylene/propylene, a starch-polyacrylate acid graft copolymer, a polyvinyl alcoholcyclic acid anhydride graft copolymer, and a starch-polyacrylonitrile graft copolymer in at least a portion of a subterranean formation comprising a lost circulation zone;
    allowing the swellable elastomer to at least partially swell upon contact with a fluid; and
    allowing the lost circulation composition to at least partially reduce the loss of fluid to the subterranean formation.

2. The method of claim 1 wherein the swellable elastomer is a particle having a particle size in the range of from about 0.1 microns to about 2000 microns.

3. The method of claim 1 wherein the swellable elastomer is present in an amount of about 0.01% to about 50% by weight of the lost circulation composition.

4. The method of claim 1 wherein the fluid is an aqueous fluid.

5. The method of claim 1 wherein the lost circulation composition is a cement composition.

6. The method of claim 1 wherein the lost circulation composition is a spacer fluid.

7. The method of claim 1 wherein the lost circulation composition is a treatment fluid.

* * * * *